(12) United States Patent
Tang

(10) Patent No.: US 10,099,134 B1
(45) Date of Patent: Oct. 16, 2018

(54) SYSTEM AND METHOD TO BETTER ENGAGE PASSIVE USERS OF A VIRTUAL SPACE BY PROVIDING PANORAMIC POINT OF VIEWS IN REAL TIME

(71) Applicant: KABAM, INC., San Francisco, CA (US)

(72) Inventor: Wilson John Tang, Vancouver (CA)

(73) Assignee: Kabam, Inc., San Francisco, CA (US)

( * ) Notice: Subject to any disclaimer, the term of this patent is extended or adjusted under 35 U.S.C. 154(b) by 526 days.

(21) Appl. No.: 14/572,430

(22) Filed: Dec. 16, 2014

(51) Int. Cl.
*G06F 3/0484* (2013.01)
*A63F 13/53* (2014.01)
*G06F 3/0481* (2013.01)
*G06T 19/00* (2011.01)

(52) U.S. Cl.
CPC .......... *A63F 13/53* (2014.09); *G06F 3/04815* (2013.01); *G06F 3/04845* (2013.01); *G06T 19/006* (2013.01)

(58) Field of Classification Search
None
See application file for complete search history.

(56) References Cited

U.S. PATENT DOCUMENTS

| 6,349,597 B1 | 2/2002 | Folkmer et al. ............... 73/504 |
| 8,581,905 B2 | 11/2013 | Mitchell ...................... 345/427 |
| 8,635,910 B2 | 1/2014 | Cato ............................. 73/548 |
| 2006/0061551 A1 | 3/2006 | Fateh ............................. 345/158 |
| 2011/0227913 A1* | 9/2011 | Hyndman ............... A63F 13/10 345/419 |
| 2012/0242664 A1 | 9/2012 | Athans et al. ............... 345/426 |
| 2012/0314899 A1 | 12/2012 | Cohen et al. ................ 382/103 |
| 2013/0027393 A1* | 1/2013 | Fujiwara ................. G06T 15/20 345/419 |
| 2013/0044258 A1 | 2/2013 | Dennis ......................... 348/445 |
| 2013/0249792 A1 | 9/2013 | Carraro et al. ............... 345/156 |
| 2015/0038224 A1* | 2/2015 | Tait .......................... A63F 13/12 463/31 |
| 2015/0363980 A1* | 12/2015 | Dorta ....................... G06T 19/20 345/419 |
| 2016/0063766 A1* | 3/2016 | Han ....................... G02B 27/017 345/633 |

(Continued)

FOREIGN PATENT DOCUMENTS

WO        2013/050473        4/2013

OTHER PUBLICATIONS

Gary Marsden and Nicholas Tip, "Navigation control for mobile virtual environments", In Proceedings of the 7th international conference on Human computer interaction with mobile devices & services (MobileHCI '05), ACM, New York, NY, USA, 2005, 279-282.*

(Continued)

*Primary Examiner* — Diane Wills
(74) *Attorney, Agent, or Firm* — Sheppard Mullin Richter & Hampton LLP

(57) ABSTRACT

Facilitating presentation of a view of the virtual space in a first view mode to users through client computing platforms and in a second view mode to users through client computing platforms. The first view mode and second view mode causing the views of the virtual space to have different view characteristics. Different inputs are effectuated when in the different view modes to facilitate interaction by the user with the virtual space in different manners.

16 Claims, 5 Drawing Sheets

(56) References Cited

U.S. PATENT DOCUMENTS

2017/0352188 A1* 12/2017 Levitt .................. G06T 19/006

OTHER PUBLICATIONS

Simpson, Johnny, "Using Mobile Accelerometers in Javascript and 3D Effects", printed from http://www.inserthtml.com/2013/07/javascript-accelerometer/, Jul. 17, 2013, 25 pages.

Crabbe, Lauren, "Hands-on with Seene: App puts 3D photos in the palm of your hand", printed from http://connect.dpreview.com/post/9779586590/hands-on-seene-smartpho, published on Oct. 18, 2013, 4 pages.

Mosendz, Polly, "Here's What Amazon's 3D Smartphone Will Probably Look Like", printed from http://www.thewire.com/technology/2014/04/what-amazons-3d-smartph/, Apr. 16, 2014, 14 pages.

* cited by examiner

SYSTEM AND METHOD TO BETTER ENGAGE PASSIVE USERS OF A VIRTUAL SPACE BY PROVIDING PANORAMIC POINT OF VIEWS IN REAL TIME

FIELD OF THE DISCLOSURE

This disclosure relates to providing multiple views modes for a virtual space and providing virtual items to users of a virtual space through the multiple view modes.

BACKGROUND

The functionality of client platforms has increased over the years. Conventional online games are provided through gaming platforms such as Facebook.com, Kabam.com, Zynga.com, Bigpoint Games, Steam, etc. These games are accessed by users through client platforms. Traditionally, games are provided having a single view mode in which there is a single set of view characteristics for any given area, or view, of a game. The increased functionality of client platforms has increased the number of ways a user may provide inputs to interact with the client platforms.

Accordingly, alternative methods of interacting with virtual spaces may provide incentives for users to interact with the online game.

SUMMARY

One aspect of the disclosure relates to a system for providing enhanced visual effects to users of a virtual space. The system may comprise one or more physical computer processors. The one or more physical computer processors may be configured by machine-readable instructions to perform one or more functions. The one or more physical processors may be configured to execute an instance of a virtual space. The virtual space may be configured to facilitate interaction, by users, in an online game.

The one or more physical processors may be configured to implement the instance of the virtual space. The instance of the virtual space may be in an action state. The virtual space may be implemented in an action state to facilitate presentation of a view of the virtual space in a first view mode. The views of the virtual space may be presented to users through client computing platforms. The views of the virtual space presented in the first view mode may facilitate navigation by the users through the virtual space. The views of the virtual space presented in the first view mode may include a first set of view characteristics.

The views of the virtual space presented to users may facilitate interaction of the users with the virtual space. Interaction by the users in the virtual space may be facilitated in response to a first set of inputs. The first set of inputs may be effectuated by the users through the client computing platforms during presentation of the views of the virtual space in the first view mode. The instance of the virtual space implemented in an action state may facilitate game play by the users. Users may interact with one or more game characters and/or game objects when in the action state.

The one or more physical processors may be configured to implement the instance of the virtual space. The instance of the virtual space may be implemented in a paused state. The instance of the virtual space may be implemented to facilitate presentation of a view of the virtual space in a second view mode. The presentation of the view of the virtual space in the second view mode to users may be facilitated through client computing platforms. Views of the virtual space presented in the second view mode may be from a fixed position in the virtual space. The views of the virtual space presented in the second view mode may facilitate rotational views of the virtual space about the fixed position. The views of the virtual space presented in the second view mode may include a second set of view characteristics.

The first set of characteristics may include views of the virtual space forward of a point-of-view of the virtual space presented to the user. The second set of characteristics may include views of the virtual space surrounding a point-of-view of the virtual space presented to the user.

The one or more physical processors may be configured to facilitate interaction of the users with the virtual space. Interaction by users with the virtual space may be facilitated in response to a second set of inputs effectuated by the users through the client computing platforms. The second set of inputs may be effectuated during presentation of views of the virtual space in the second view mode. The second set of inputs may be different from the first set of inputs.

The paused state may include instances when gameplay has been paused or suspended. For example, users of the virtual space may experience periods when they are waiting for other players to join the game play. In such situations, users may be presented a view of a virtual space in a paused state. The paused state may be any inactive state of the virtual space. For example, the inactive state may be entered into at a time during game play. The inactive state may be entered into prior to commencement of game play. The views of the virtual space when the virtual space is in a paused state may facilitate rotational changes in the views presented to the user based on the inputs provided by the user using the second set of inputs.

As another example, the second view mode may be activated and/or entered into when the virtual space is in a passive state. An example of a passive state may include during a cinematic period. Another example may include when users are waiting before commencement of game play or commencement of an active state of the game. For example, during game play when the user is presented with views of the virtual space in the first view mode, when the virtual space is in an active state, the user may trigger an event. The event may be presented to the user in response to the trigger by the user. The event may be a cinematic video. Views of the virtual space may be presented to the user during the cinematic in a second view mode. During a passive state users may be waiting for other users to join a game or an event in a game. Users may wait in a lobby. The users may be presented views of the lobby in the second view mode.

The virtual space may facilitate rotational views of the cinematic, or any view of a virtual space in a second view mode, being presented to the users. The views of the cinematic and/or other aspect of the virtual space may rotate in response to one or more inputs of the second set of inputs being received from the user. For example, the user may rotate his or her client computing device during the cinematic to rotate the views of the virtual space about a fixed position.

In some implementations, during a cinematic period, the system may facilitate pausing of the cinematic playback. Users may interact with the client computing platform during a cinematic video. A user may interact with the client computing platform to provide an indication that the user wishes to pause the cinematic video. In response to the cinematic video being paused, views of the virtual space represented in the cinematic video may be presented to the users. Rotational changes of the views of the virtual space representing the cinematic video may be facilitated. Users may interact with the virtual space to facilitate rotational changes in views of the virtual space about a fixed position.

The one or more physical processors may be configured to facilitate selection and/or entry by users of the view mode in which to present views of the virtual space through the client computing platforms. The users may interact with the client computing platform to enter and/or select the first view mode. The users may interact with the client computing platform to enter and/or select the second view mode. In some implementations the paused state of the virtual space may be initiated by the user. In the paused state changes in the views of the virtual space may be facilitated in response to inputs corresponding to the second set of inputs.

When views of the virtual space are presented to the users in the first view mode, selection and/or entry of the first set of inputs may be effectuated. When views of the virtual space are presented to the users in the second view mode, selection and/or entry of the second set of inputs may be effectuated. The first and second sets of inputs may be effectuated through the client computing platforms. At least one of the second set of inputs may be different from individual ones of the first set of inputs.

The client computing platforms may comprise one or more motion sensors. The one or more motion sensors may be configured to detect an orientation of the client computing platforms. The one or more motion sensors may be configured to provide an output signal comprising orientation information. Individual ones of the inputs of the second set of inputs may correspond to orientation information from the one or more motion sensors.

The one or more physical computer processors may be configured by machine-readable instructions to obtain a first set of virtual items. The first set of virtual items may be obtained for presentation to users in the virtual space. The first set of virtual items may be presented in views of the virtual space presented in the second view mode.

Individual ones of the first set of virtual items may be presented to the users in response to effectuation of the second set of inputs by the users. Individual ones of the virtual items may be presented to the users in the virtual space in response to orientation information provided by the one or more sensors of the client computing device providing an indication that the orientation of the client computing device has changed.

The virtual items of the first set of virtual items may be assigned a first set of positions within the virtual space in response to a first entry and/or selection by the user of the second view mode. The virtual items of the first set of virtual items are assigned a second set of positions within the virtual space in response to a second entry and/or selection by the user of the second view mode. The second set of positions may be different from the first set of positions.

The one or more physical computer processors may be configured by machine-readable instructions to detect an interaction by the users with the virtual space. The interaction may indicate selection of individual ones of the first set of virtual items. In response to an indication of the selection of individual ones of the first set of virtual items, the one or more physical computer processors may be configured by machine-readable instructions to provide to the user the selected virtual item. The selected virtual item may be used by the user in the virtual space.

The one or more physical computer processors may be configured by machine-readable instructions to facilitate a presentation of a change in the view of the virtual space. The change in the view of the virtual space may comprise an animation. The virtual space may be presented to users in the second view mode. The change in the view of the virtual space may be effectuated in response to a change in the orientation information of the client computing platform from the one or more sensors of the client computing platform. The change in the view of the virtual space may correspond to the change in the orientation information from the one or more sensors of the client computing platform. The change in the view of the virtual space may comprise an animation of views of the virtual space, the animation depicting the virtual space moving consistently with the indicated motion information from the one or more sensors of the client computing platform.

One aspect of the disclosure relates to a method for providing enhanced visual effects to users of a virtual space. The method may be performed using one or more physical computer processors. The method may comprise executing an instance of a virtual space. The method may comprise implementing the instance of the virtual space.

The instance of the virtual space may be implemented in an action state. The instance of the virtual space implemented in an action state may facilitate presentation of a view of the virtual space in a first view mode. The presentation of the views of the virtual space to users may be facilitated through client computing platforms. Views of the virtual space may be presented in the first view mode to facilitate navigation by the users through the virtual space. Views of the virtual space that may be presented in the first view mode may include a first set of view characteristics. The instance of the virtual space may be implemented to facilitate interaction of the users with the virtual space. Interaction with the virtual space may be facilitated in response to a first set of inputs effectuated by the users. The first set of inputs may facilitate lateral changes in the views of the virtual space presented to the user.

The instance of the virtual space may be presented in a paused state. The method may comprise implementing the instance of the virtual space in a paused state to facilitate presentation of a view of the virtual space in a second view mode. Presentation to users of the views of the virtual space in the second view mode may be facilitated through client computing platforms. The instance of the virtual space may be presented in a passive state. Views of the virtual space presented in the second view mode may be from a fixed position. Views of the virtual space presented in the second view mode may facilitate rotational views of the virtual space about the fixed position. Views of the virtual space presented in the second view mode may include a second set of view characteristics. The instance of the virtual space may be implemented to facilitate interaction of the users with the virtual space. Interaction of the users with the virtual space may be facilitated in response to a second set of inputs effectuated by the users through the client computing platforms. The second set of inputs may be different from the first set of inputs. The second set of inputs may facilitate a rotational change in the views of the virtual space presented to the user.

The method may comprise facilitating selection and/or entry of the view mode by users of the virtual space. The method may comprise receiving individual ones of the first set of inputs effectuated by the users through views of the virtual space in the first view mode. The method may comprise receiving individual ones of the second set of inputs effectuated by the users through the virtual space in the second view mode. At least one of the second set of inputs may be different from the inputs of the first set of inputs.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
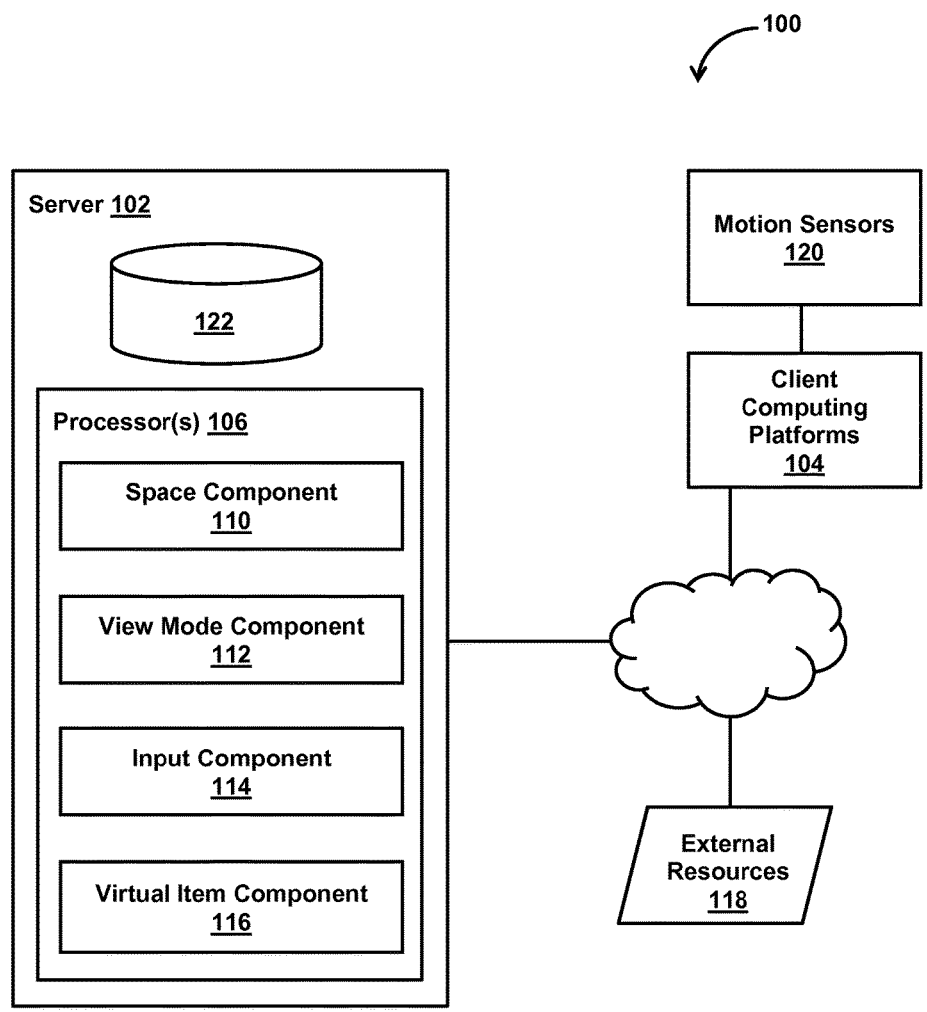
FIG. 1a illustrates a system for providing enhanced visual effects to users of a virtual space, in accordance with one or more implementations.

FIG. 1a illustrates a system 100 for providing enhanced visual effects to users of a virtual space. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104.

Figure 1B:
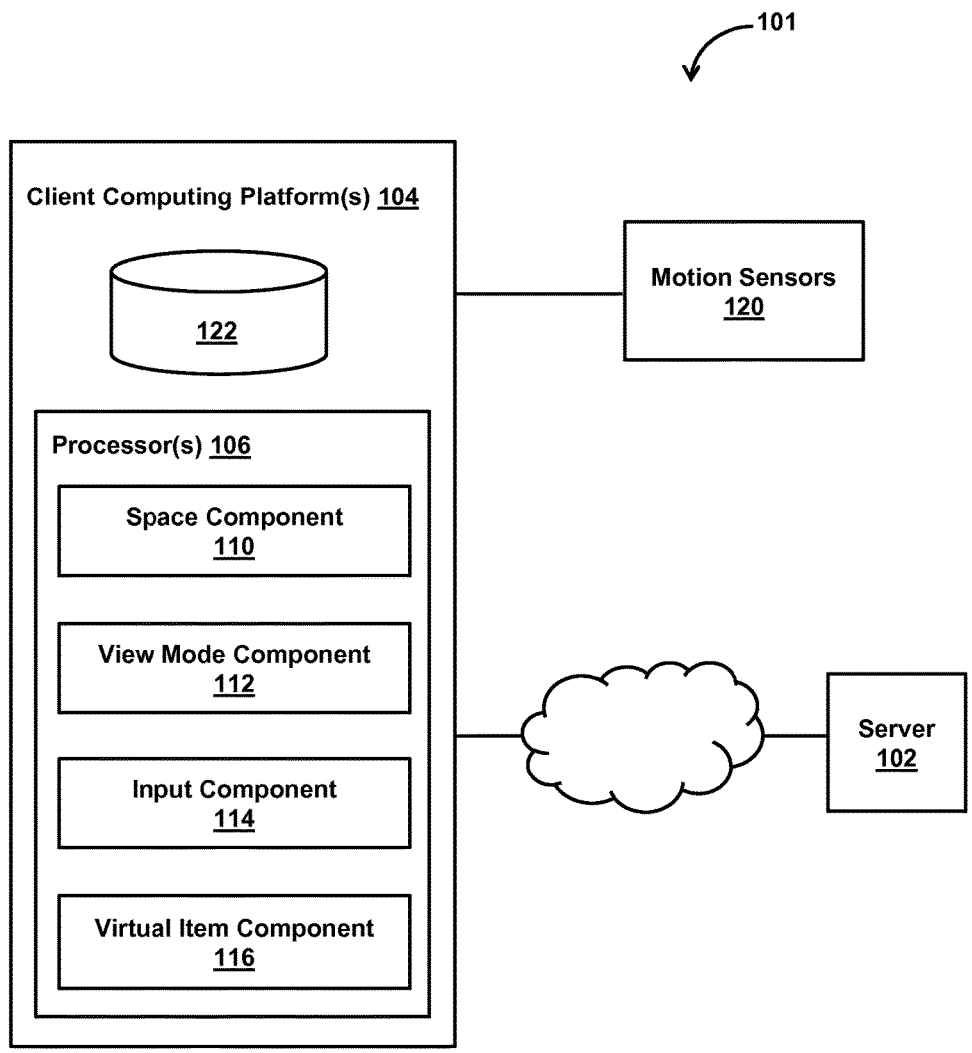
FIG. 1b illustrates a system for providing enhanced visual effects to users of a virtual space, in accordance with one or more implementations.

FIG. 1b illustrates a system 101 for providing enhanced visual effects to users of a virtual space. Providing the virtual space may include hosting the virtual space on a client computing platform 104. Providing the virtual space may include hosting the virtual space over a network. In some implementations, system 100 may include a server 102. The client computing platform 104 may be configured to communicate with server 102 according to a client/server architecture. The users may access system 100 and/or the virtual space via client computing platforms 104.

The server 102 and/or client computing platforms 104 may be configured to execute one or more computer program components. The computer program components may include one or more of a space component 110, a view mode component 112, an input component 114, a virtual item component 116, and/or other components.

The system 100 may comprise a user component that may be configured to access and/or manage one or more user profiles and/or user information associated with users of the system 100. The one or more user profiles and/or user information may include information stored by server 102, one or more of the client computing platforms 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space component 110 may be configured to implement the instance of the virtual space executed by the computer components to determine state of the virtual space. In some implementations, such as implementations of FIG. 1a, the state may be communicated (e.g., via streaming visual data, object/position data, and/or other state information) from server 102 to client computing platforms 104 for presentation to users. In some implementations, such as implementations of FIG. 1b, the state may facilitate presentation of views of the virtual space, based on the state of the virtual space, by the client computing platform(s) 104 directly. The determined state transmitted to and/or used by client computing platform 104 may correspond to a view for a user character being controlled by a user via the given client computing platform 104. The determined state may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by space component 110 is not intended to be limiting. The space component 110 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user-controlled element(s) may move through and interact with the virtual space (e.g., non-user characters in the virtual space and/or other objects in the virtual space). The user-controlled elements controlled by and/or associated with a given user may be created and/or customized by the given user. The user may have an "inventory" of virtual goods and/or currency that the user can use (e.g., by manipulation of a user character or other user-controlled element, and/or other items) within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server 102 (e.g., through space component 110).

The instance of the virtual space and/or the game that takes place therein may be persistent. That is, the virtual space and/or the game may continue on whether or not individual players are currently logged in and/or participating in the game. A player who logs out of the virtual space and then logs back in some time later may find the virtual space has been changed through the interactions of other players with the virtual space during the time the player was logged out. These changes may include changes to the simulated physical space, changes in the player's inventory, changes in other players' inventories, changes experienced by non-player characters, and/or other changes.

Figure 2:
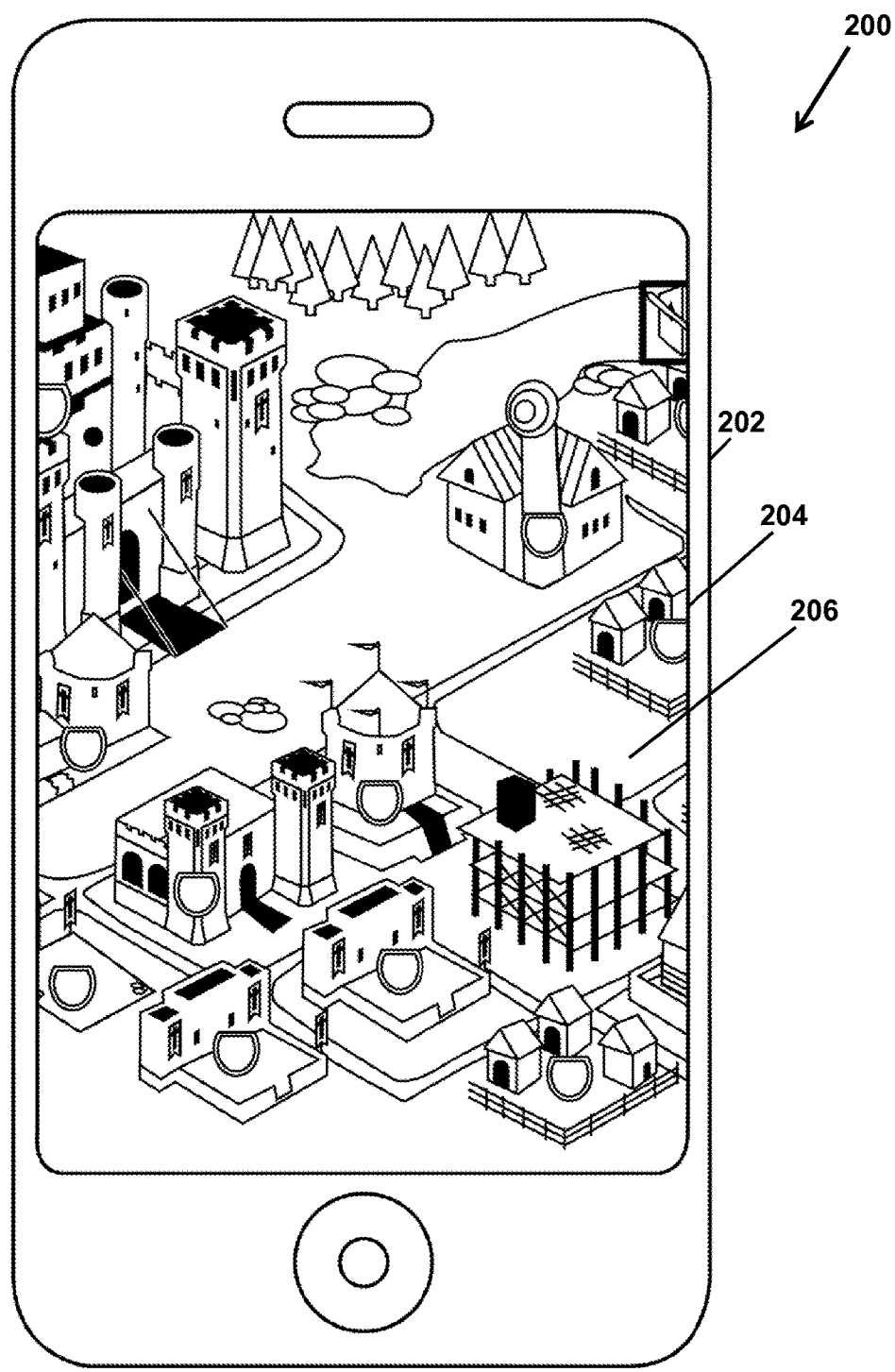
FIG. 2 illustrates a client computing platform presenting a view of a virtual space in a first view mode, in accordance with one or more implementations.

Referring to FIG. 2, illustrated is a system 200 for presenting a virtual space to a user. Such views of the virtual space may be presented to the user during a period when the virtual space is in an active state. The space component 110 may be configured to implement the virtual space to facilitate presentation of a view 206 of the virtual space in a first view mode. The views of the virtual space may be presented through a client computing platform 202. The view 206 of the virtual space presented in the first view mode may include a first set of view characteristics. The first set of view characteristics may include a perspective-type of the virtual space that is presented to the user. The example illustrated in FIG. 2 shows a view 206 of a virtual space presented to the user such that the user views the virtual space from an elevated position looking down at the views of the virtual space 206. The first set of view characteristics of the views of the virtual space presented in the first view mode may include a perspective view of the virtual space in front of the point-of-view presented to the user through the client computing platform 202.

The space component 110 may be configured to present views of the virtual space presented to users to facilitate interaction by the users with the virtual space. The input component 114 may be configured facilitate entry and/or selection of one or more inputs by the user. Interaction by the users in the virtual space 206 may be facilitated in response to a first set of inputs. The first set of inputs may be effectuated by the users through the client computing platforms 202 during presentation of the views of the virtual space 206 in the first view mode. An example of individual ones of the first set of inputs may include functions provided by a screen 204. The screen 204 of the client computing platform 202 may be a touch screen. Users may interact with the touchscreen 204 to interact with the client computing platform 202. In turn, the interactions with the touchscreen 204 may facilitate interaction, by the user, with the virtual space 206. The first set of inputs may facilitate lateral changes in the views of the virtual space presented to the user. For example, a user may swipe one or more of his or her fingers across the touchscreen 204 to move his or her view of the virtual space. For example, a user may swipe to the right on the touchscreen 204 so that the view presented of the virtual space moves to the right, showing the area of the virtual space to the left of the screen. A user may tap the touchscreen 204 at a location, indicating that the user intends to interact with a virtual item in the virtual space 206. In response to the user tapping and/or interacting with the touchscreen 204 at a location associated with a virtual item, the space component 110 may be configured to implement an action associated with the virtual item. Such actions may include providing the virtual item to the user for use by the user in the virtual space 206. Virtual items may provide a benefit to the user in the virtual space 206.

Figure 3A:
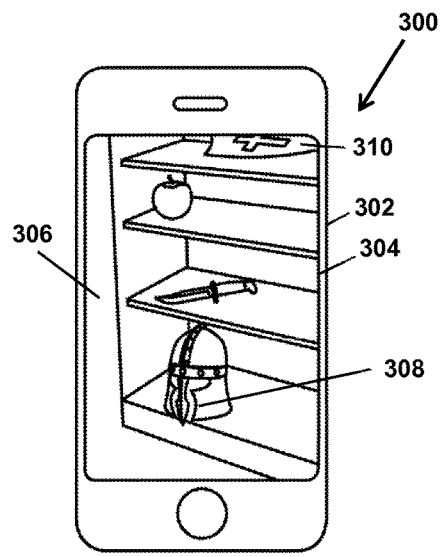
FIG. 3a illustrates a client computing platform presenting a first instance of a view of a virtual space in a second view mode, in accordance with one or more implementations.
Figure 3B:
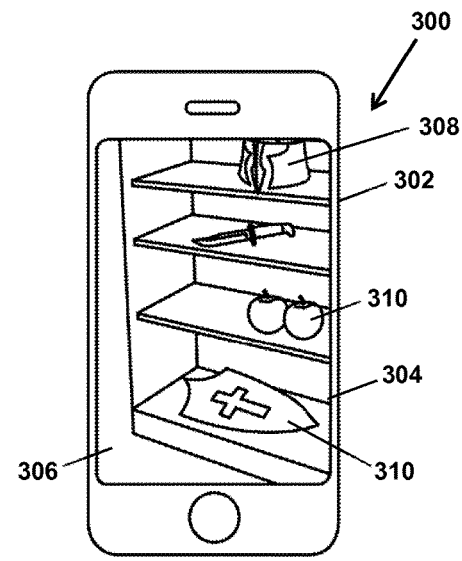
FIG. 3b illustrates a client computing platform presenting a second instance of a view of a virtual space in a second view mode, in accordance with one or more implementations.
Figure 3C:
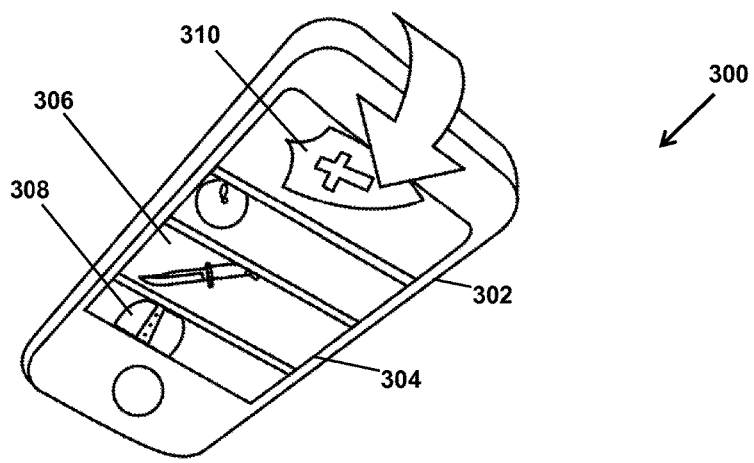
FIG. 3c illustrates a client computing platform presenting a changed first instance of a view of a virtual space in a second view mode, in accordance with one or more implementations.

Referring to FIGS. 3*a*, 3*b*, and 3*c*, illustrated is an example of a system 300 for providing views of a virtual space 306 to users. The virtual space 306 may be presented to a user through an interface 304 of a client computing platform 302. The client computing platform may be a portable client computing platform, such as a smartphone, laptop, and/or other portable client computing platforms.

The space component 110 may be configured to implement the instance of the virtual space 306. The instance of the virtual space 306 may be implemented to facilitate presentation of views of a virtual space during a paused state of the virtual space. The instance of the virtual space 306 may be implemented to facilitate presentation of a view of the virtual space 306 in a second view mode. The view mode component 112 may be configured to facilitate selection and/or entry by the user of a view mode for viewing the virtual space on the client computing platform 302. The views of the virtual space in the second view mode, when the virtual space is in the paused state, may facilitate rotational views of the virtual space. The rotational views of the virtual space may be from a fixed position.

While the views shown in FIGS. 3a-3c show a virtual space during paused game play, the present disclosure is also applicable to when the virtual space is in a passive state. Examples of when the virtual space is in a passive state may include when users are awaiting other users to join the game, for example, in a game lobby. Similarly, the passive state may include when users are presented with a cinematic during game play. During the cinematic, views of a virtual space may be presented to the user. The views may be presented in the second view mode. The views may be presented such that the views in the second view mode may facilitate a rotational change of view about a fixed position.

The presentation of the view of the virtual space 306 in the second view mode to users may be facilitated through client computing platforms 302. Views of the virtual space 306 presented in the second view mode may include a second set of view characteristics. The second set of characteristics may include views of the virtual space 306 surrounding a point-of-view of the virtual space 306 presented to the user. The one or more processors 106 may be configured to implement the virtual space, such that view information of portions of the virtual space in front of, above, below, behind, to the left, and/or to the right of the point-of-view presented to the user is provided to the client computing platform 302.

The view mode component 112 may be configured to facilitate selection and/or entry of a view mode for views of the virtual space 306.

The virtual item component 116 may be configured to obtain a first set of virtual items. The first set of virtual items may be obtained for presentation to users in the virtual space 306. The first set of virtual items 308 may be presented in views of the virtual space 306 presented in the second view mode. As shown in FIG. 3a, the virtual items 308 of the first set of virtual items may be assigned a first set of positions within the virtual space in response to a first entry and/or selection by the user of the second view mode. As shown in FIG. 3b, the virtual items 308 of the first set of virtual items are assigned a second set of positions, different from the first set of positions, within the virtual space in response to a second entry and/or selection by the user of the second view mode. In some embodiments, for successive entries and/or selections of the second view mode, the positions of the virtual items 308 of the first set of virtual items may be different.

The input component 114 may be configured to facilitate interaction of the users with the virtual space 306. Interaction by users with the virtual space 306 may be facilitated in response to a second set of inputs effectuated by the users through the client computing platforms 302. The second set of inputs may be effectuated during presentation of views of the virtual space 306 in the second view mode, such as the views illustrated in FIGS. 3a-3c. The second set of inputs may be different from the first set of inputs. The second set of inputs may facilitate rotational changes in the view of the virtual space when the virtual space is in the paused state.

The client computing platforms 306 may comprise one or more motion sensors 120 (as shown in FIGS. 1a and 1b). The one or more motion sensors 120 may be configured to facilitate a detection of an orientation of the client computing platforms. The one or more motion sensors 120 may be configured to facilitate a detection of a change in the orientation of the client computing platforms. The one or more motion sensors 120 may be configured to detect other properties of the client computing platforms 120. In some embodiments, the client computing platforms 302 may comprise other sensors. For example, the client computing platforms 302 may comprise a sensor configured to facilitate a determination of a location at which the user is looking. The motion sensors 120 may be configured to facilitate a detection of a direction in which the client computing platform 302 is being moved. The motion sensors 120 may be configured to facilitate a detection of a change in direction in which the client computing platform 302 is being moved.

The motion sensors 120 may include an accelerometer, barometer, gyroscope, magnetometer, ambient light sensor, proximity sensor, network position sensor, and/or other motion sensors. The accelerometer may be configured to facilitate the detection of a change in orientation or direction of movement of the client computing platform. The barometer may be configured to facilitate the determination of a change in the altitude of the client computing platform. The gyroscope may be configured to measure the orientation of the client computing platform. The magnetometer may be configured to facilitate a determination of a location and/or orientation of the client computing platform based the magnetic field at the client computing platform. The magnetometer may be configured to facilitate a determination of a change in location and/or change in orientation of the client computing platform. The ambient light sensor may be configured to determine changes in ambient light measurements, indicating a change in orientation or direction of the client computing platform. A network position sensor may be configured to determine a signal strength between the network base station and the network position sensor. The network position sensor may be configured to determine a signal strength between multiple network base stations and the network position sensor.

The one or more motion sensors 120 may be configured to provide an output signal comprising orientation information. Individual inputs of the second set of inputs may correspond to orientation information from the one or more motion sensors. For example, as shown in FIG. 3c, the client computing platform 302 may be tilted. Motion sensors 120 may be configured to provide an output signal comprising orientation and/or location information of the client computing platform 302. The orientation and/or location information may include information about an orientation and/or a location of the client computing device and/or a change in the orientation and/or change in location of the client computing device.

Individual ones of the first set of virtual items may be positioned within the virtual space 306 such that they are not visible or are only partially visible to the user. For example, as shown in FIG. 3a, the first virtual item 310 may be positioned within the virtual space 308 such that it is only partially visible within the virtual space. Individual ones of the second set of inputs may correspond to one or more output signals carrying orientation information from the one or more motion sensors 120.

The virtual item component 116 may be configured to facilitate presentation of virtual items. Individual ones of the first set of virtual items 308 may be presented to the users in response to effectuation of a second set of inputs by the users. For example, a first virtual item 310 may be presented to the user, as shown in FIG. 3a. The first virtual item 310 may be positioned in the virtual space at a location not visible or partially visible to the user. The user may interact with the client computing platform 302 (104 as shown in FIGS. 1a and 1b) to change the orientation and/or location of the client computing platform 302. In response to the movement of the client computing platform 302 by the user, the view of the virtual space 306 presented to the user through the client computing platform 302 may change. The change in the view of the virtual space 306 presented to the user may correspond to the orientation and/or location information provided by the one or more motion sensors of the client computing platform.

It shall be understood that the change in the orientation of the client computing platform 306 as shown in FIG. 3c shall not be limiting. The present disclosure contemplates movement by the client computing platform 302 in any direction and/or orientation. Views of the virtual space 306 presented through the client computing platform 302 may be changed to correspond with the movement of the client computing platform 302.

The one or more physical computer processors 106 (as shown in FIGS. 1a and 1b) may be configured by machine-readable instructions to detect an interaction by the users with the virtual space 306. The interaction may indicate selection of individual ones of the first set of virtual items. In response to an indication of the selection of individual ones of the first set of virtual items, the one or more physical computer processors 106 may be configured by machine-readable instructions to provide to the user the selected virtual item. The selected virtual item may be used by the user in the virtual space. For example, as shown in FIG. 3a, views of the virtual space 306 presented to the user in the second view mode may be presented through the client computing platform 302. A first virtual item 308 may be presented to the user in the virtual space 306. The client computing platform 302 may comprise a touchscreen 304. In response to the user tapping the touchscreen 304 at a location corresponding to the location of the first virtual item 308, the first virtual item 308 may be provided to the user for use in the virtual space by the user.

In some implementations, the views of the virtual space presented to the user may correlate to information received from one or more other sensors of the client computing platform 302. Views of the virtual space presented to the user may be environment-specific. Views of the virtual space presented to the user may correlate with an environment in which the client computing platform 302 is located. For example, the client computing platform 302 may comprise a temperature sensor. Views of the virtual space 306 presented to the user may resemble a cold environment.

In some implementations, as shown in FIGS. 1a and 1b, the server 102, client computing platforms 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 118 may be operatively linked via some other communication media.

As shown in FIG. 1b, a given client computing platform 104 may include one or more processors 106 configured to execute computer program components. The computer program components may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

The external resources 118 may include sources of information, hosts, and/or providers of virtual environments outside of system 100, external entities participating with system 100, and/or other resources. In some implementations, some or all of the functionality attributed herein to external resources 118 may be provided by resources included in system 100.

The server 102 and/or client computing platform 104 may include electronic storage 122, one or more processors 106, and/or other components. The server 102 may include communication lines, or ports to enable the exchange of information with a network and/or other computing platforms. Illustration of server 102 in FIG. 1a and client computing platform 104 in FIG. 1b is not intended to be limiting. The server 102 and/or client computing platform 104 may include a plurality of hardware, software, and/or firmware components operating together to provide the functionality attributed herein to server 102. For example, server 102 may be implemented by a cloud of computing platforms operating together as server 102.

Electronic storage 122 may comprise electronic storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor 106, information received from server 102, information received from client computing platforms 104, and/or other information that enables server 102 to function as described herein.

Processor(s) 106 is configured to provide information processing capabilities in server 102 or client computing platform 104. As such, processor 106 may include one or more of a digital processor, an analog processor, a digital circuit designed to process information, an analog circuit designed to process information, a state machine, and/or other mechanisms for electronically processing information. Although processor 106 is shown in FIGS. 1a and 1b as a single entity, this is for illustrative purposes only. In some implementations, processor 106 may include a plurality of processing units. These processing units may be physically located within the same device, or processor 106 may represent processing functionality of a plurality of devices operating in coordination. The processor 106 may be configured to execute components 110, 112, 114, 116, and/or other components. Processor 106 may be configured to execute components 110, 112, 114, 116, and/or other components by software; hardware; firmware; some combination of software, hardware, and/or firmware; and/or other mechanisms for configuring processing capabilities on processor 106.

It should be appreciated that, although components 110, 112, 114, and 116 are illustrated in FIGS. 1*a* and 1*b* as being co-located within a single processing unit, in implementations in which processor 106 includes multiple processing units, one or more of components 110, 112, 114, 116, and/or other components may be located remotely from the other components. The description of the functionality provided by the different components 110, 112, 114, 116, and/or other components described below is for illustrative purposes and is not intended to be limiting, as any of components 110, 112, 114, 116, and/or other components may provide more or less functionality than is described. For example, one or more of components 110, 112, 114, 116, and/or other components may be eliminated, and some or all of its functionality may be provided by other ones of components 110, 112, 114, 116, and/or other components. As another example, processor 106 may be configured to execute one or more additional components that may perform some or all of the functionality attributed below to one of components 110, 112, 114, 116, and/or other components.

Figure 4:
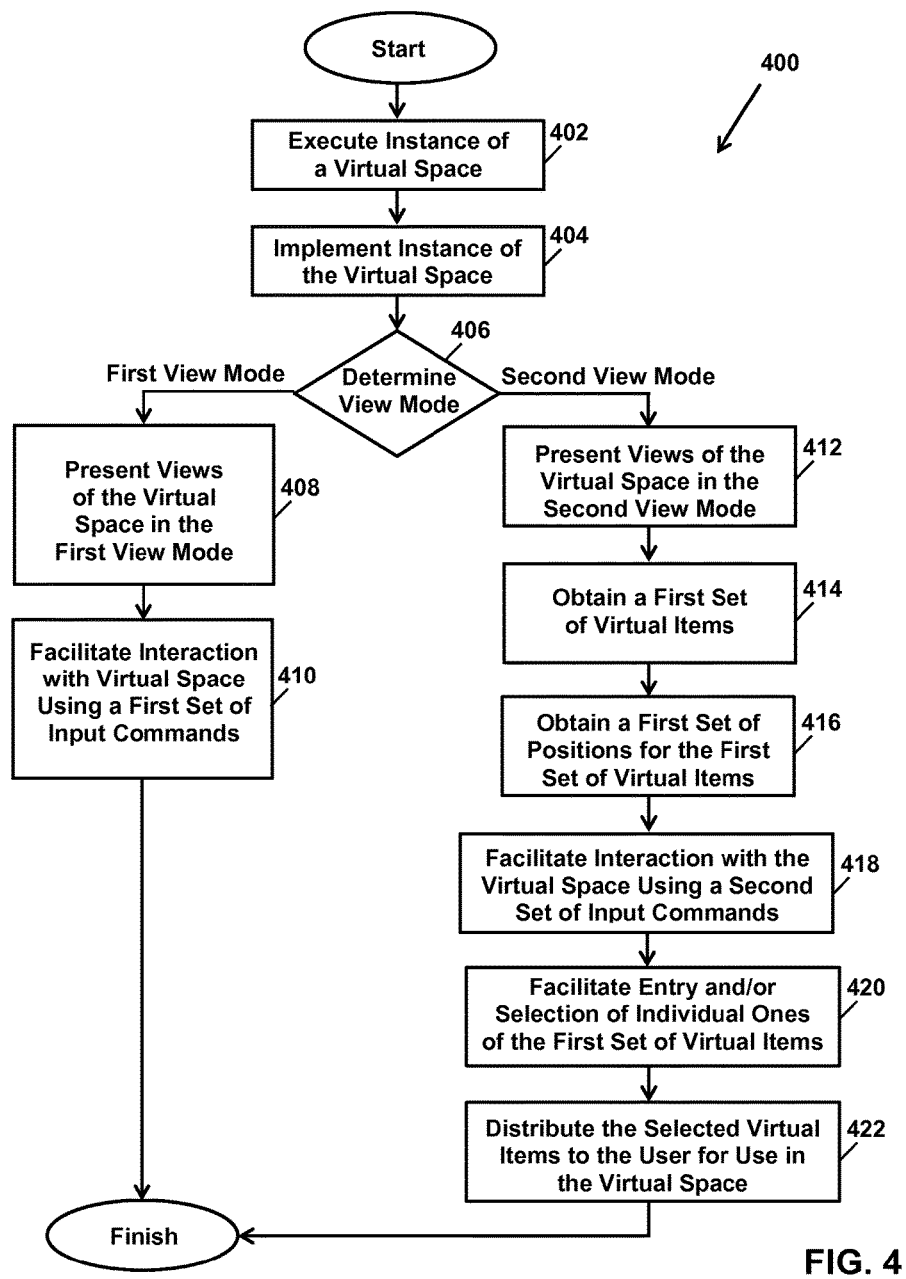
FIG. 4 illustrates a method for providing enhanced visual effects to users of a virtual space, in accordance with one or more implementations.

FIG. 4 illustrates a method 400 of hosting a virtual space to client computing devices for interaction by users. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, a virtual space may be executed. The actions at operation 402 may be performed by a space component, such as space component 110 shown in FIGS. 1*a* and 1*b*.

At an operation 404, a virtual space may be implemented. The actions at operation 404 may be performed by a space component, such as space component 110 shown in FIGS. 1*a* and 1*b*.

At an operation 406, a determination of a selection of a view mode may be determined. The actions at operation 406 may be performed by a view mode component, such as view mode component 112 shown in FIGS. 1*a* and 1*b*.

In response to a determination of a selection and/or entry of a first view mode at operation 406, at an operation 408 views of the virtual space may be presented to the user through a client computing platform in a first view mode. The actions at operation 408 may be performed by a space component, such as space component 110 shown in FIGS. 1*a* and 1*b*.

At an operation 410, interaction with the virtual space using a first set of input commands may be facilitated. The actions at operation 410 may be performed by an input component, such as input component 114 shown in FIGS. 1*a* and 1*b*.

In response to a determination of a selection and/or entry of a second view mode at operation 406, at an operation 412 a view of the virtual space may be presented to the user through a client computing platform in a second view mode. The actions at operation 412 may be performed by a space component, such as space component 110 shown in FIGS. 1*a* and 1*b*.

At an operation 414, a first set of virtual items may be obtained. The actions at operation 414 may be performed by a space component, such as space component 110 shown in FIGS. 1*a* and 1*b*.

At an operation 416, a first set of positions of the virtual items may be obtained. At an operation 416, a second set of positions of the virtual items may be obtained in response to an indication that the virtual space has been viewed in the second view mode at a previous time. The actions at operation 416 may be performed by a virtual item component, such as virtual item component 116 shown in FIGS. 1*a* and 1*b*.

At an operation 418, interaction with the virtual space may be facilitated. The actions at operation 418 may be performed by an input component, such as input component 114 shown in FIGS. 1*a* and 1*b*.

At an operation 420, selection of the one or more virtual items by the user may be facilitated. The actions at operation 420 may be performed by an input component, such as input component 114 shown in FIGS. 1*a* and 1*b*.

At an operation 422, in response to selection of one or more virtual items by the user at an operation 420, the one or more selected virtual items may be distributed to the user. The actions at operation 422 may be performed by an virtual item component, such as virtual item component 116 shown in FIGS. 1*a* and 1*b*.

Although the present technology has been described in detail for the purpose of illustration based on what is currently considered to be the most practical and preferred implementations, it is to be understood that such detail is solely for that purpose and that the technology is not limited to the disclosed implementations but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for providing enhanced visual effects to users of a game within a virtual space, the system comprising:
   one or more physical computer processors configured by machine-readable instructions to:
   execute an instance of a virtual space in which an online game is instantiated and implement the instance of the virtual space in an active state of the online game to:
   (i) facilitate presentation of views of the virtual space in a first view mode to the users through touchscreens associated with client computing platforms during game play in the online game, wherein the views of the virtual space presented in the first view mode facilitate navigation by the users through the virtual space and include a first set of view characteristics, wherein individual users are associated with individual client computing platforms, wherein individual touchscreens are associated with individual client computing platforms, and (ii) facilitate interaction of the users with the virtual space via game play in the online game in response to a first set of inputs effectuated by the users by physically interacting with the touchscreens associated with the client computing platforms during presentation of the views of the virtual space in the first view mode, wherein the inputs in the first set of inputs are input to the touchscreens by manually engaging the touchscreens, wherein the inputs in the first set of inputs facilitate the game play and a lateral change in the views of the virtual space presented to the users in the active state of the online game, wherein the inputs by individual users are input to the same individual touchscreens as used to present the views in the first view mode to the individual users;

implement the instance of the virtual space in a paused state of the online game to:
  (i) facilitate presentation of the views of the virtual space in a second view mode to the users through the touchscreens associated with the client computing platforms during game play in the online game, wherein the views of the virtual space presented in the second view mode are from a fixed position in the virtual space and facilitate rotational views of the virtual space about the fixed position and include a second set of view characteristics, wherein presentations to the individual users are facilitated through the same individual touchscreens as used to present the views in the first view mode to the individual users, and wherein the presentations to the individual users include a set of virtual items, and
  (ii) facilitate interaction of the users with the virtual space in response to a second set of inputs effectuated by the users through the client computing platforms during presentation of the views of the virtual space in the second view mode, wherein the second set of inputs by the users include:
    (a) changing physical orientations of the client computing platforms and facilitating a rotational change in the views of the virtual space presented to the users, wherein changing the physical orientations of the client computing platforms changes physical orientations of the touchscreens correspondingly, and
    (b) selection of one or more virtual items from the set of virtual items;

facilitate selection and/or entry by the users of the virtual space of the first or second view mode in which to present views of the virtual space through the touchscreens associated with the client computing platforms;

receive individual ones of the first set of inputs effectuated by the users through the views of the virtual space in the first view mode and facilitate the game play via the first view mode;

receive individual ones of the second set of inputs effectuated by the users through the virtual space in the second view mode, wherein at least one of the second set of inputs is different from the inputs of the first set of inputs; and responsive to selection in the paused state of the one or more virtual items from the set of virtual items, and further responsive to subsequent use of the active state, facilitate presentation of the views in the first view mode that include the one or more selected virtual items from the set of virtual items.

2. The system of claim 1, wherein the one or more physical computer processors are configured by machine-readable instructions to obtain the set of virtual items for presentation to the users in the virtual space when views of the virtual space are presented in the second view mode.

3. The system of claim 2, wherein individual ones of the set of virtual items are presented to the users in response to effectuation of the second set of inputs by the users.

4. The system of claim 2, wherein individual ones of the set of virtual items are presented to the users in the virtual space in response to orientation information provided by one or more sensors of the client computing device providing an indication that a physical orientation of the client computing device has changed.

5. The system of claim 2, wherein the virtual items of the set of virtual items are assigned a first set of positions within the virtual space in response to a first entry and/or selection by an individual user of the second view mode, and wherein the virtual items of the set of virtual items are assigned a second set of positions within the virtual space in response to a second entry and/or selection by the individual user of the second view mode, wherein the second set of positions is different from the first set of positions.

6. The system of claim 2, wherein the one or more physical computer processors are configured by machine-readable instructions to:
  detect an interaction by an individual user with the virtual space indicating selection of individual ones of the first set of virtual items; and
  provide to the individual user the selected virtual item for use by the individual user in the virtual space.

7. The system of claim 1,
  wherein the first set of view characteristics includes views of the virtual space forward of a point-of-view of the virtual space presented to the users, and
  wherein the second set of view characteristics includes views of the virtual space surrounding a point-of-view of the virtual space presented to the users.

8. The system of claim 1, wherein the rotational change in the views of the virtual space corresponds to orientation information from one or more sensors of the client computing platforms.

9. A method for providing enhanced visual effects to users of a game within a virtual space, the method performed using one or more physical computer processors, the method comprising:
  executing an instance of a virtual space in which an online game is instantiated;
  implementing the instance of the virtual space in an active state of the online game to:
  (i) facilitate presentation of views of the virtual space in a first view mode to the users through touchscreens associated with client computing platforms during game play in the online game, wherein the views of the virtual space presented in the first view mode facilitate navigation by the users through the virtual space and include a first set of view characteristics, wherein individual users are associated with individual client computing platforms, wherein individual touchscreens are associated with individual client computing platforms, and
  (ii) facilitate interaction of the users with the virtual space via game play in an online game in response to a first set of inputs effectuated by the users by physically interacting with the touchscreens associated with the client computing platforms during presentation of the views of the virtual space in the first view mode, wherein the inputs in the first set of inputs are input to the touchscreens by manually engaging the touchscreens, wherein the inputs in the first set of inputs facilitate the game play and a lateral change in the views of the virtual space presented to the users in the active state of the online game, wherein the inputs by individual users are input to the same individual touchscreens as used to present the views in the first view mode to the individual users;

implementing the instance of the virtual space in the paused state of the online game to:

(i) to facilitate presentation of the views of the virtual space in a second view mode to the users through the touchscreens associated with the client computing platforms during game play in the online game, wherein the views of the virtual space presented in the second view mode are from a fixed position in the virtual space and facilitate rotational views of the virtual space about the fixed position and include a second set of view characteristics, wherein presentations to the individual users are facilitated through the same individual touchscreens as used to present the views in the first view mode to the individual users, and wherein the presentations to the individual users include a set of virtual items, and (ii) facilitate interaction of the users with the virtual space in response to a second set of inputs effectuated by the users through the client computing platforms during presentation of the views of the virtual space in the second view mode, wherein the second set of inputs are input by the users include:

(a) changing physical orientations of the client computing platforms and facilitating a rotational change in the views of the virtual space presented to the users, wherein changing the physical orientations of the client computing platforms changes physical orientations of the touchscreens correspondingly, and (b) selection of one or more virtual items from the set of virtual items;

facilitating selection and/or entry by the users of the virtual space of the first or second view mode in which to present views of the virtual space through the touchscreens associated with the client computing platforms;

receiving individual ones of the first set of inputs effectuated by the users through the views of the virtual space in the first view mode and facilitate the game play via the first view mode;

receiving individual ones of the second set of inputs effectuated by the users through the virtual space in the second view mode, wherein at least one of the second set of inputs is different from the inputs of the first set of inputs; and responsive to selection in the paused state of the one or more virtual items from the set of virtual items, and further responsive to subsequent use of the active state, facilitating presentation of the views in the first view mode that include the one or more selected virtual items from the set of virtual items.

10. The method of claim 9, further comprising obtaining the set of virtual items for presentation to the users in the virtual space when views of the virtual space are presented in the second view mode.

11. The method of claim 10, wherein individual ones of the set of virtual items are presented to the users in response to effectuation of the second set of inputs by the users.

12. The method of claim 10, wherein individual ones of the set of virtual items are presented to the users in the virtual space in response to orientation information provided by one or more sensors of the client computing device providing an indication that a physical orientation of the client computing device has changed.

13. The method of claim 10, wherein the virtual items of the set of virtual items are assigned a first set of positions within the virtual space in response to a first entry and/or selection by an individual user of the second view mode, and wherein the virtual items of the set of virtual items are assigned a second set of positions within the virtual space in response to a second entry and/or selection by the individual user of the second view mode, wherein the second set of positions is different from the first set of positions.

14. The method of claim 10, wherein the method further comprises:

detecting an interaction by an individual user with the virtual space indicating selection of individual ones of the set of virtual items; and providing to the individual user the selected virtual item for use by the individual user in the virtual space.

15. The method of claim 9, wherein the first set of view characteristics includes views of the virtual space forward of a point-of-view of the virtual space presented to the users, and wherein the second set of view characteristics includes views of the virtual space surrounding a point-of-view of the virtual space presented to the users.

16. The method of claim 9, wherein the rotational change in the views of the virtual space corresponds to orientation information from one or more sensors of the client computing platforms.

* * * * *